United States Patent [19]

Pascaru

[11] Patent Number: 5,582,440
[45] Date of Patent: Dec. 10, 1996

[54] SEGMENTED HEADER PIPE FOR INDUSTRIAL PRETREATMENT WASHERS

[76] Inventor: Michael J. Pascaru, 25815 Briarwood Ct., Westlake, Ohio 44145

[21] Appl. No.: 429,538

[22] Filed: Apr. 26, 1995

[51] Int. Cl.⁶ .............................. F16L 23/00; F16L 37/00; B05B 1/20
[52] U.S. Cl. .......................... 285/373; 285/423; 285/150; 285/312
[58] Field of Search ...................... 285/409, 410, 285/411, 336, 365, 423, 312, 150, 112, 373

[56] References Cited

U.S. PATENT DOCUMENTS

| | | | |
|---|---|---|---|
| 3,625,552 | 12/1971 | Mahoff | 285/336 |
| 3,695,638 | 10/1972 | Blakeley | 285/112 |
| 4,059,296 | 11/1977 | Panourgias | 285/312 |
| 4,065,846 | 1/1978 | Leonard, Jr. | 285/411 |
| 4,222,593 | 9/1980 | Lauffenburger | 285/312 |
| 4,288,108 | 9/1981 | Streit | 285/137.1 |
| 4,407,533 | 10/1983 | Giebeler | 285/365 |
| 4,460,201 | 7/1984 | McGugan | 285/365 |
| 4,640,530 | 2/1987 | Abbes et al. | 285/336 |
| 5,076,617 | 12/1991 | Bronnert | 285/336 |
| 5,257,739 | 11/1993 | Pascaru | 239/266 |

FOREIGN PATENT DOCUMENTS

| | | | |
|---|---|---|---|
| 4105206 | 8/1992 | Germany | 285/365 |

*Primary Examiner*—Eric K. Nicholson
*Attorney, Agent, or Firm*—James H. Tilberry

[57] ABSTRACT

Interconnecting short plastic pipe segments, with at least one stub shaft molded onto each pipe segment. A polymer selected from one of the polyolefins, such as polypropylene, is the preferred plastic because of its resistance to chemical erosion and because polypropylene, unlike some other plastics, such as polyvinylchlorides, can be recycled. The pipe segments can be economically molded in segments of about one foot in length, and are rigidly held together by novel load-bearing clamps.

12 Claims, 5 Drawing Sheets

SEGMENTED HEADER PIPE FOR INDUSTRIAL PRETREATMENT WASHERS

BACKGROUND OF THE INVENTION

1. Field of Invention

A primary field of the invention is industrial spraying equipment to clean, rinse, and/or chemical-treat articles of manufacture. The spraying takes place in a confined area, such as a spray or washer booth, in which various liquids are piped under pressure through horizontal overhead or bottom feed pipes, called headers, into a plurality of vertical pipes, called risers, connected to the headers, and then out through nozzles which are attached to the risers and which are adapted to spray workpieces in the washer booth.

Another field of the invention is fire protection water sprinkler systems.

Yet another field of the invention is agricultural irrigation and sprinkler systems.

2. Description of Related Art

Prior art washer booths are customarily made of steel, and are basically rectangular, with means for a parts conveyor to pass through. They are usually equipped with a pair of header pipes spaced apart and running parallel and longitudinal to the washer booth floor or ceiling. Industrial liquids are stored in a tank underneath the washer booth floor and pumped through suitable plumbing to the headers. A bank of risers is connected to each header, extending vertically upward or downward along an adjacent washer booth wall. Several nozzles are secured to each riser of each bank of risers and are aimed inwardly to spray workpieces being conveyed between opposed banks of risers.

Prior art headers have universally been cut to length from a single piece of steel or extruded chlorinated polyvinylchloride (CPVC) pipe, customarily supported against bending every five feet of horizontal length. CPVC, for about half the material and labor costs of steel, has to a large extent replaced steel for low temperature washing up to 180° F., but CPVC cannot be used for bath temperatures in excess of that temperature. Because of the corrosiveness of the phosphates, stainless steel headers have been used for second stage pretreatment, which consists of spraying the metal work products with a metallic coating from the phosphate family, such as zinc or iron. Applicant's U.S. Pat. No. 5,257,739 teaches the use of glass-filled polyolefin, which is resistant to corrosives and withstands high bath temperatures up to 220° F., for molded segmented risers, but polyolefin has not been used heretofore for headers, which are much larger and heavier than risers. Risers have approximately one-fifth the diameter of headers, and their vertical positioning incurs substantially no bending stress. Polyolefins must be glass-filled for strength, and glass-filled polyolefins are not extrudable. The technique of connecting vertically positioned polyolefin riser segments is not transferable to the connecting of header segments because header joints are subject to bending stresses which segmented riser pipe joint cannot withstand.

Because CPVC headers and polyolefin risers are incompatible, they cannot be glued, welded, molded, or otherwise bonded together. Accordingly, they must be secured together with special clamp connectors or by threading. Molding CPVC headers for attachment to polyolefin risers with special connector fittings is not economically feasible because of the high cost of tooling. Furthermore, securing polyolefin risers to steel headers requires two separate skills, plastic pipe fitting and steel pipe fitting, and is therefore labor intensive.

Recently it has been discovered that CPVC develops so-called "chemical stress cracks" due to an increasingly higher percentage of surfactants in use in some cleaning stages of washers. These cracks may begin to occur after six to twelve months of operation. As a consequence, some industrial users of chemicals for cleaning and treating metal parts have discontinued the use of CPVC in their washer piping systems and have returned to the use of black iron or stainless steel pipes.

There are several other disadvantages to the use of one-piece headers, whether steel or CPVC. They must be custom cut to length from standard longer pieces, which leaves considerable unusable scrap. Also, if the header becomes obstructed, the entire assembly of header, feeder pipes, and risers must be disassembled in order to remove the obstruction. If any portion of the header should be defective, the entire header must be scrapped. Since the locations of riser connectors must be predetermined and custom pre-drilled, replacement of a header requires that all connecting risers be custom fitted to the replacement header. These are all expensive, labor-intensive procedures.

Furthermore, interstate transportation is difficult due to the length of prior art one-piece headers twenty feet or longer, and overseas shipment is particularly difficult.

Applicant's invention of glass-filled polyolefin header pipe segments with novel molded connectors permits the use of all-polyolefin pipe installations, at less cost and less installation time than prior art steel or CPVC installations.

SUMMARY OF THE INVENTION

The present invention solves the last remaining problem for providing an all-purpose, all-polyolefin, header-riser installation for industrial washer baths. The invention comprises a polyolefin segmented pipe header that is, for all practical purposes, as strong and as serviceable as a one-piece steel or CPVC header, while retaining all the advantages of segmented pipe installations. In addition to complementing Applicant's segmented riser invention, the concept of the present invention can be adapted to make all washer bath supporting connections from segmented pipe. Thus, bath recirculating feeder pipes may now also be made from molded polyolefin segmented pipe, embodying the same concept as the inventive molded polyolefin header segmented pipe.

In particular, the inventive header comprises a series of short uniform pipe segments molded from a glass fiber or glass bead reinforced polymerized olefinic monomer, of which polypropylene is an example. A single pipe segment is approximately twelve inches in length and five inches in diameter, and is adapted to be longitudinally interconnected with leakproof joints to provide a header which is self supporting and is as rigid as prior art steel or CPVC one-piece header pipes in lengths of five feet or more. Thus no more than one pipe segment of less than twelve inches need be cut to length, thereby reducing scrap pipe to less than twelve inches per header. Furthermore, the plastic scrap can be recycled, thereby eliminating substantially all pipe scrap loss. By molding the pipe segments from a glass fiber or glass bead reinforced polyolefin, the temperature of the bath can be increased to 220° F., from the 180° F. to which CPVC headers are limited. In addition, the interior wall surface of a polyolefin pipe segment is inherently smoother than the corresponding interior wall surface of steel or extruded CPVC header pipe, so that there is less tendency for contaminants to adhere and to accumulate on polyolefin interior wall surfaces. This results in longer life and less maintenance and downtime with an all-molded polyolefin pipe system.

A riser connector of compatible polyolefin can now be integrally molded into each polyolefin header pipe segment, which eliminates any possibility of pressure loss due to leakage between the connector and the header, and eliminates a separate riser connector fitting and its cost of installation. Also, connectors in one pipe segment may be easily aligned for connecting a riser at a different angle than a riser connected to another header pipe segment.

In one preferred embodiment of the invention, an O-ring groove is formed in the exterior rim of one pipe segment for sealing engagement with the interior rim of an adjacent pipe segment. To provide strength to the header and to lock header adjacent pipe segments together, locking grooves are formed in the exterior surfaces of adjacent pipe segments which are engaged by locking rings formed on special molded split clamps or collars which nest in the locking grooves.

As thus described, the inventive header segmented pipes enable a header to be assembled which is as rigid as a single-piece header and which provides previously unobtainable adjustment means for its risers which may be quickly connected to and disconnected from the inventive segmented headers.

This inventive concept is readily usable in related arts, such as in fire protection systems and in agricultural irrigation and sprinkling systems.

OBJECTS OF THE INVENTION

It is therefore among the objects of this invention to provide molded segmented pipes for industrial conveyance and distribution of fluids, without limitation.

It is also among the objects of this invention to provide, in particular, molded segmented pipes for use in industrial spraying in which a riser connector is simultaneously and integrally molded to each header segmented pipe.

It is another object of the invention to provide a washer booth recirculating system made entirely from polyolefin plastics.

It is another object of this invention to provide a header segmented pipe which is selectively shiftable about its longitudinal axis.

It is another object of the invention to permit a washer booth recirculating system made entirely from plastic parts which are weldable together.

It is another object of this invention to provide a segmented header in which pressure loss between the header and riser connector is eliminated.

It is another object of this invention to provide novel means to secure header segmented pipe portions together to form a load-bearing header.

It is another object of the invention to provide a quick release connector between a header pipe segment and a riser.

It is another object of the invention to provide a header made from segmented pipes which are indexable about a common axis.

It is another object of this invention to provide a header made from a recyclable glass fiber or glass bead reinforced polyolefin plastic.

It is another object of this invention to provide a header which reduces unusable scrap during manufacture, is easier and quicker to install in a washer booth, is easier to clean and to keep clean, and is easier to install and dismantle from a washer booth than prior art headers.

It is another object of the invention to provide a molded glass-filled polyolefin header and compatible glass-filled polyolefin riser connectors integrally molded together which can be used with a bath temperature at least 40° higher than the bath temperatures which can be safely used with CPVC headers.

A still further object of the invention is to provide a pipe segment having universal application in all fluid transmission fields, where ready adaptability to solve problems of space limitations and geometric configurations are paramount, such as in fire protection systems and agricultural irrigation and sprinkler systems.

Other objects and advantages of the invention will become apparent to those skilled in the art upon reading the following specification taken in conjunction with the accompanying drawings.

DETAILED DESCRIPTION OF PREFERRED EMBODIMENTS OF THE INVENTION

Figure 1:
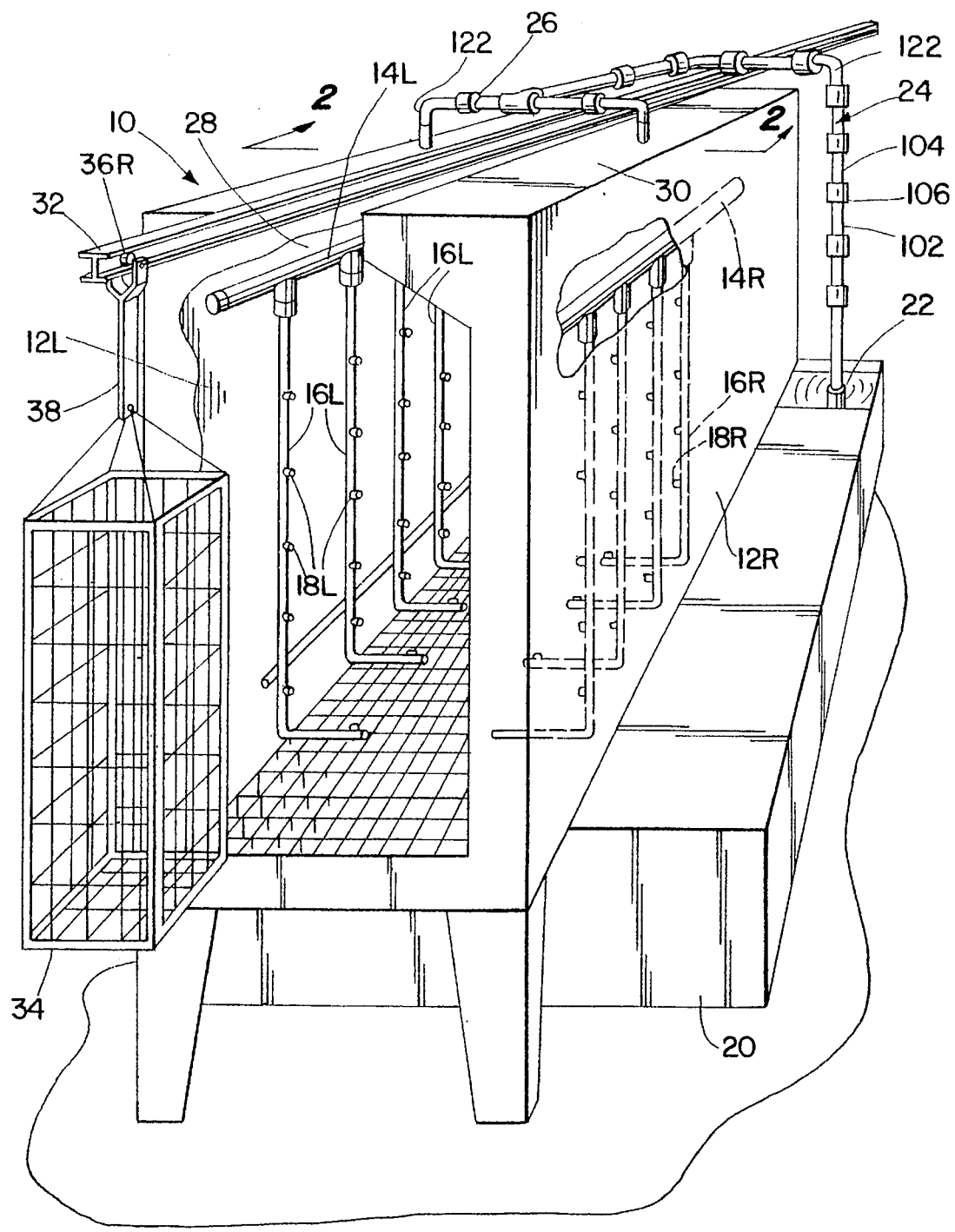
FIG. 1 is a perspective view of a washer booth showing the inventive headers and riser connectors.
Figure 2:
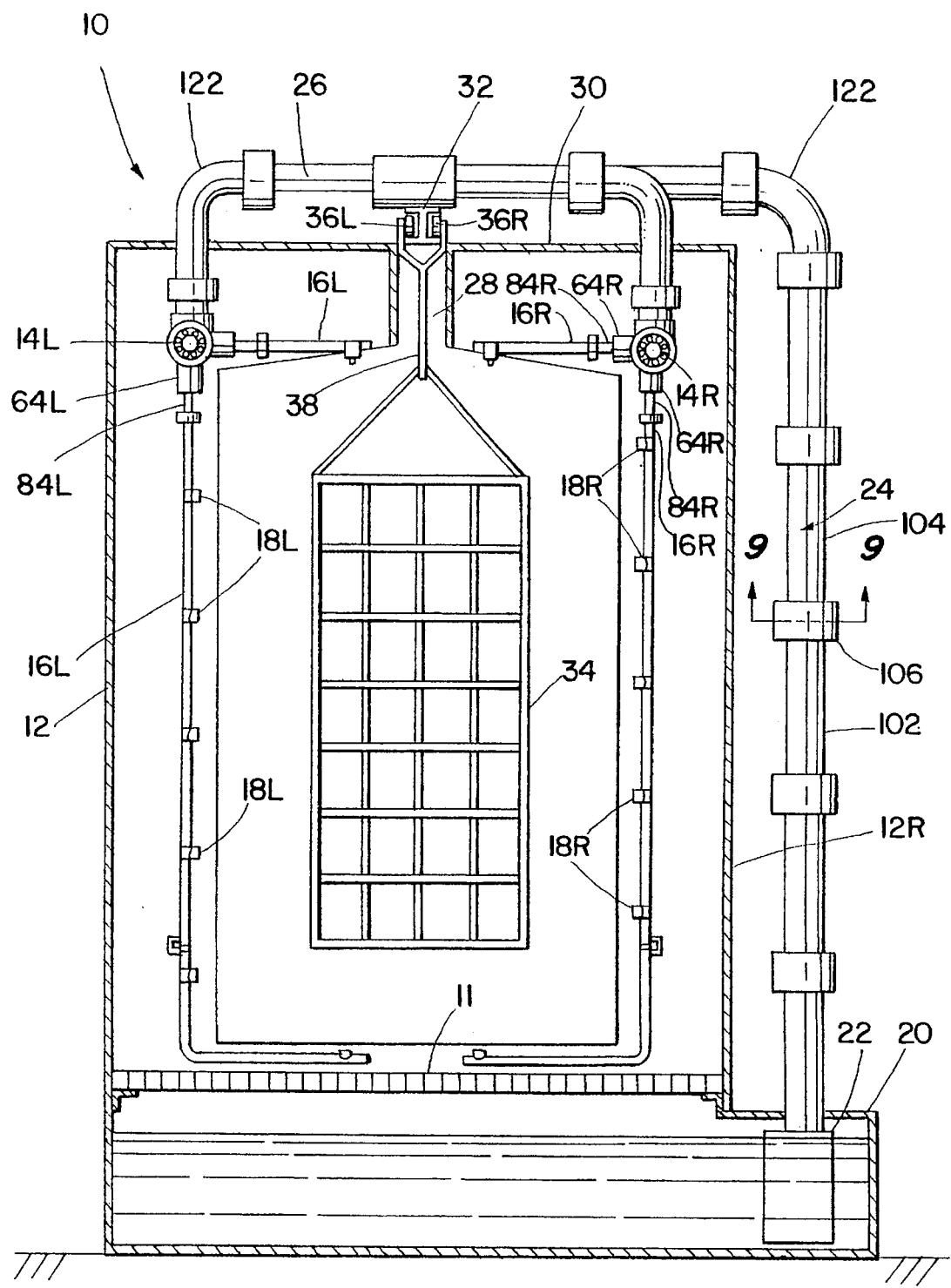
FIG. 2 is a section taken along the line 2—2 of FIG. 1.

An industrial washer booth 10 is shown in FIGS. 1 and 2, in which can be seen, adjacent and parallel to washer booth panels 12L and 12R, a preferred embodiment of the inventive header pipes 14L and 14R and riser pipes 16L and 16R attached to header pipes 14L and 14R, respectively. Spray nozzles 18L and 18R are secured at about one-foot intervals on riser pipes 16L and 16R, respectively. The floor of the washer booth 10 comprises steel or plastic grating 11 through which spray liquids drain into storage tank 20. A submersible recirculating pump 22 is mounted in storage tank 20, from which the liquid is recirculated up pipe 24 to cross over pipe 26 and then down into header pipes 14L and 14R and riser pipes 16L and 16R. A longitudinal opening 28 is provided in ceiling 30 of washer booth 10 adapted to receive an I-beam guide rail 32 for supporting work product basket 34. The work product basket 34 is suspended from the guide rail 32 by means of guide rail rollers 36L and 36R and wire support harnesses 38 depending from rollers 36 and secured to basket 34. The basket 34 may be conveyed through the washer booth 30 by any means well known in the prior art such as a motor-driven endless wire rope or chain, or by pushing or pulling the baskets through the washer booth 20 by a washer booth operator.

Figure 3:
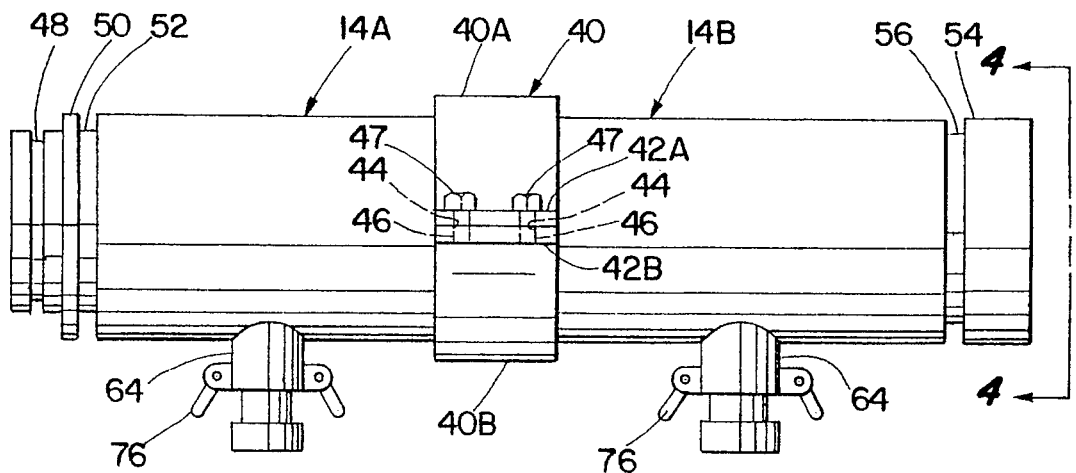
FIG. 3 is a side elevational view of a pair of inventive header pipe segments secured together with a novel bifurcated collar.
Figure 6:
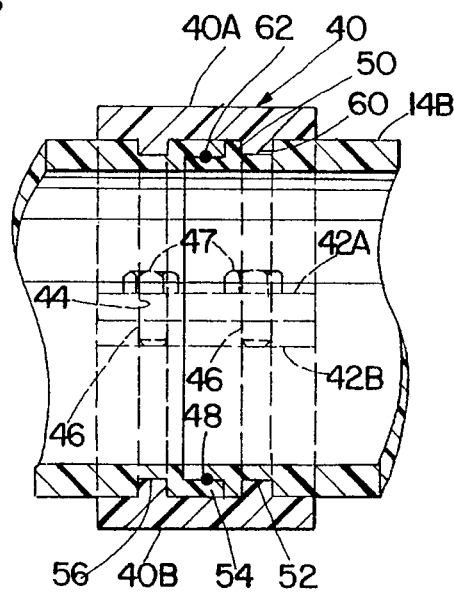
FIG. 6 is an enlarged fragmentary sectional view of a preferred embodiment of the invention, showing in greater detail the means for connecting one inventive header pipe segment to another inventive header pipe segment.
Figure 5:
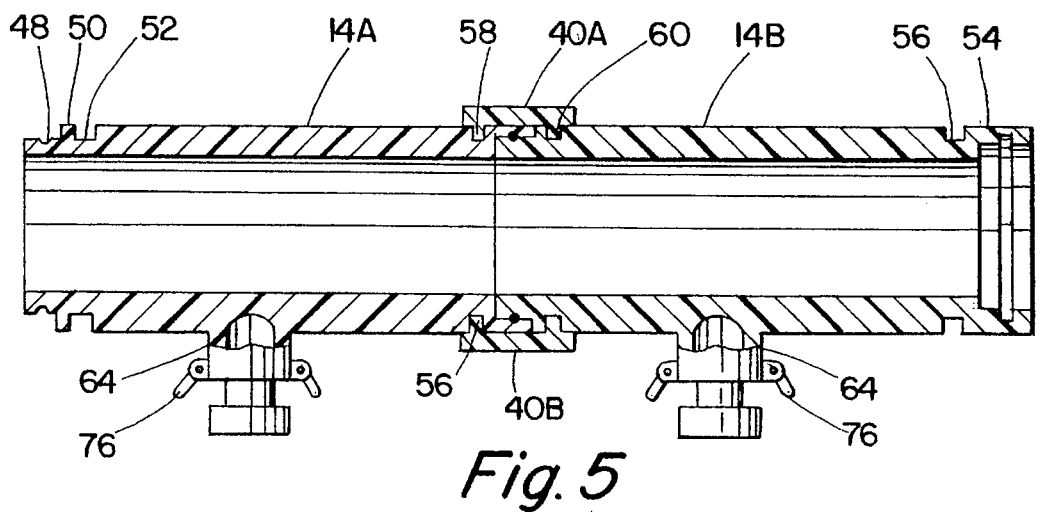
FIG. 5 is a longitudinal elevational sectional view of the pair of inventive header pipe segments taken along the line 5—5 of FIG. 4.

Referring to FIG. 3, therein is shown a preferred embodiment of a pair of identical inventive header pipe segments 14A and 14B secured together with a split collar 40 comprising 180° arcuate segments 40A and 40B provided with threaded fastener flanges 42A and 42B, which contain holes 44 and 46 to receive threaded fasteners 47. As best shown in FIG. 6, holes 46 are threaded to receive the threaded ends of threaded fasteners 47.

The inventive header pipe segment is molded from a glass fiber or glass bead reinforced polyolefin which has been selected for its high strength and resistance to high temperatures and corrosive liquids. Polypropylene is an example of a preferred polyolefin for the purposes of this invention. CPVC cannot match the physical properties of these polyolefins for use as headers. Each header pipe segment is approximately twelve inches in length and is approximately four to five inches in diameter.

Referring again to FIG. 3, the left end of each header pipe segment is provided with an O-ring groove 48, an external collar locating ring 50, and an external collar locating groove 52. The right end of each header pipe segment is provided with an external collar locating ring 54 and an external collar locating groove 56. Referring in particular to FIG. 6, collar segments 40A and 40B are each provided with an internal locating ring 58 to nest in the external collar locating pipe segment groove 56 of FIG. 3 and an internal locating ring 60 to nest in external collar locating pipe segment groove 52. An O-ring 62, FIG. 6, is fitted in O-ring groove 48, FIG. 3, and then collar segments 40A and 40B are fitted about left and right axially aligned ends of header pipe segments 14A and 14B. When nested about the left and right ends of a pair of header pipe segments, the flange collar segments 42A and 42B are secured together with threaded fasteners, such as bolts or cap screws 47, FIG. 6.

Figure 4:
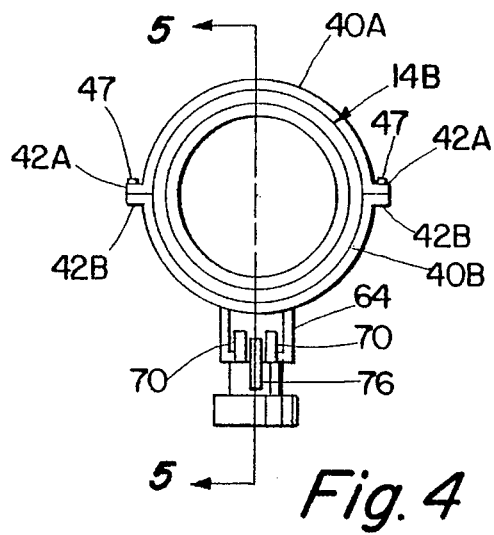
FIG. 4 is a right end view of the pair of inventive header pipe segments, taken along the line 4—4 of FIG. 3.
Figure 7:
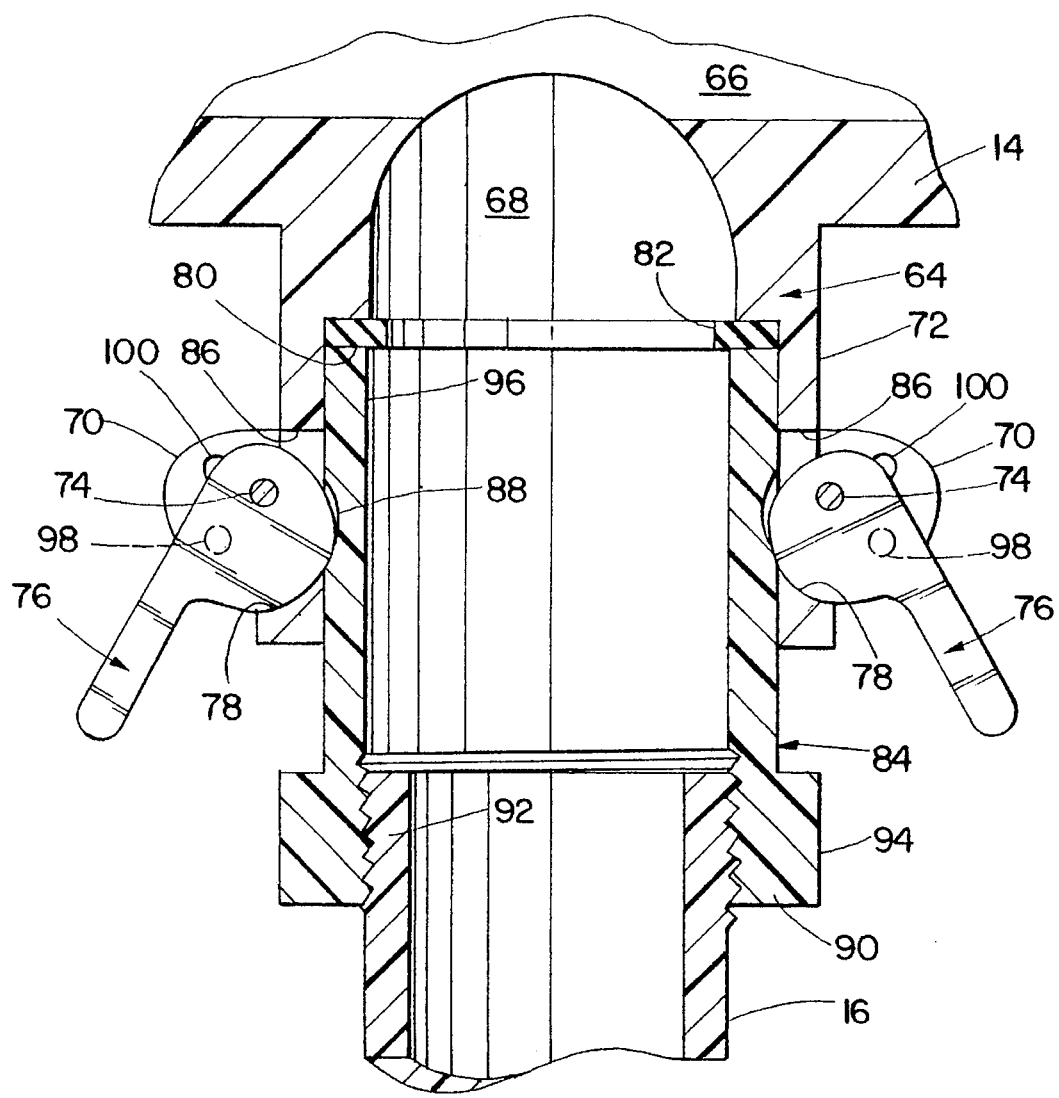
FIG. 7 is an enlarged fragmentary detailed sectional view of the inventive header cam lock quick disconnect module schematically shown in FIGS. 3, 4, and 5.
Figure 8A:
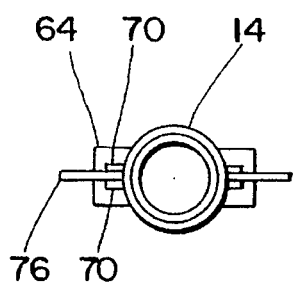
FIGS. 8A, 8B, and 8C are schematic representations of cross sections of the invention demonstrating possible combinations and locations of cam lock connectors.
Figure 8B:
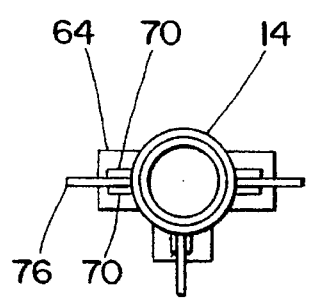
Figure 8C:
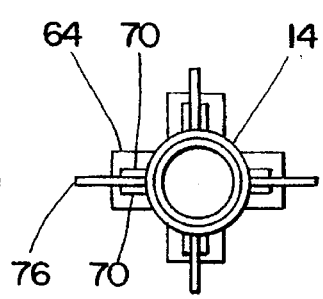

One or more quick connect-disconnect stub shafts 64 may be integrally molded with each header pipe segment as shown in FIGS. 8A, 8B, and 8C. As best shown in FIG. 7, the integrally molded stub shaft 64 communicates with the interior 66 of header pipe segment 14 through molded hole 68. Pairs of clevis ears 70 (see also FIG. 4) are molded on opposite sides of the exterior surface of wall 72 of stub shaft 64. Journaled between each pair of clevis ears 70 on pivot pin 74 is a cam configured locking lever 76 having a cam face 78. A ridge 80 is molded on the interior of stub shaft 64 against which a washer seal 82 is positioned. A riser connector sleeve 84 is telescopically fitted within stub shaft 64 with its upper end 96 bearing against washer seal 82. Openings 86 in the wall 72 of stub shaft 64 permits the cam faces 78 of locking levers 76 to engage groove 88 molded in the outer wall surface of sleeve 84. By forcing locking levers 76 downwardly, cam faces 78 are first urged upwardly into engagement with groove 88. The cam faces 78 are configured so that continued downward movement of levers 76 urges sleeve 84 upwardly into pressure engagement with washer seal 82. The lower end 90 of connector sleeve 84 is internally pipe threaded to engage external pipe threads of the upper end 92 of riser 16.

In assembly, the lower end 90 of connector sleeve 84 is first threaded onto the upper end 92 of riser 16. A flange 94 is integrally molded on the lower end 90 of connector sleeve 84 to provide a gripping surface for a pipe wrench, vise or the like, in order to obtain a tight, leak-proof fit between the interlocking pipe threads of the connector sleeve 84 and the riser end 92. The connector sleeve 84 is then slip-fit inserted into the quick connect-disconnect stub shaft 64 until its upper end 96 mades contact with the lower flat face of washer seal 82. Cam levers 76 are then simultaneously rotated downwardly to force cam faces 78 into engagement with groove 88 and to urge connector sleeve 84 upwardly into pressure sealing contact with washer seal 82. To disconnect a riser 16 from the header 14, it is only necessary to shift the cam levers 76 upwardly until the cam faces 78 disengage from groove 88. The riser 16 can then be pulled downwardly until the connector sleeve 84 disengages from quick connect-disconnect stub shaft 64.

Although riser 16 is shown in FIG. 7 as depending from header pipe segment 14, it will be understood that the header can be placed in the washer booth 10 adjacent the washer booth floor grating 11, whereupon the riser would project vertically upwardly therefrom. The structure and concept of the invention remain the same without any modification whether the header is adjacent the washer booth ceiling 30 or adjacent the washer booth floor grating 11. As shown in FIGS. 8A, 8B, and 8C, the header can be advantageously located other than adjacent the washer booth walls 12, shown in FIGS. 1 and 2. Thus, as shown in FIG. 8A, the header can be located so as to feed risers extending horizontally in opposite directions from the header. The embodiment of the invention shown in FIG. 8B shows means to feed risers not only in horizontally opposite directions but also upwardly or downwardly. With the embodiment of FIG. 8C, the header can be most advantageously located centrally in the washer booth 10 so as to feed headers projecting in all four quadrants about the header. Furthermore, because the inventive header is segmented, it can be easily set up to feed multiple risers from one header segment, as shown in FIGS. 8A, 8B, and 8C, as well as to feed a single riser, such as shown in FIG. 3. The subject invention enables numerous header-riser combinations, and the ability to quickly connect and disconnect header pipe sections and risers makes fuller utilization of the spray booth economically feasible for short runs of products having special spraying requirements.

As shown in FIG. 7, holes 98 and 100 may be provided in clevis ears 70 to insert pins or cotter keys to hold cam levers 76 in either the lower or upper locked positions. Thus, when cam levers 76 are in the fully lowered locked positions, pins, not shown, through holes 98 will secure the cam levers 76 in the locked positions. With the cam levers 76 in the upper unlocked positions, pins through holes 100 will secure the cam levers 76 in the upper unlocked positions so as not to interfere with the insertion of connector sleeve in, or removal from, quick connect-disconnect stub shaft 64.

Figure 9:
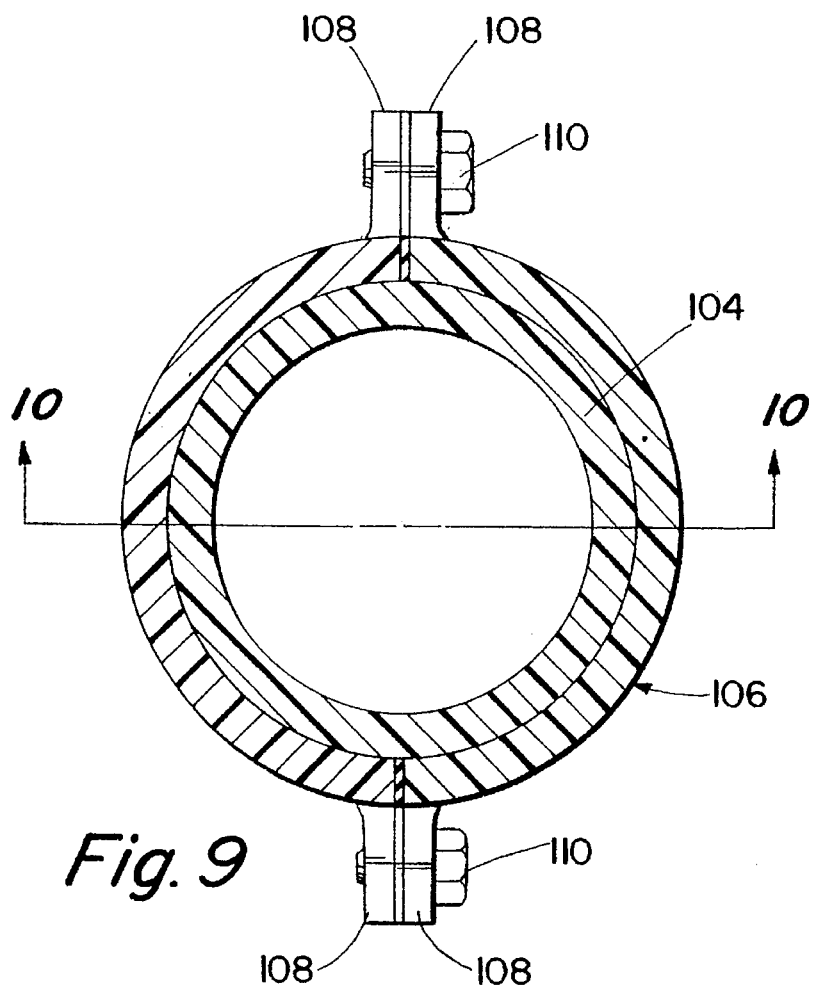
FIG. 9 is a cross-sectional view of a preferred embodiment of the invention taken along the lines 9—9 of FIGS. 2 and 10.
Figure 10:
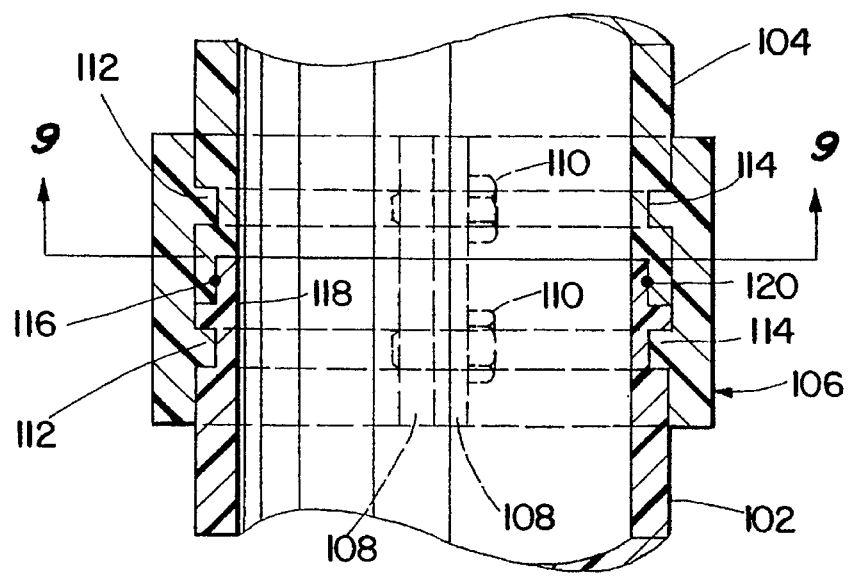
FIG. 10 is a fragmentary longitudinal sectional view of a preferred embodiment of the invention taken along the line 10—10 of FIG. 9.

The same inventive concept disclosed and discussed with respect to headers 14 can also be applied to the other portions of the washer booth recirculation system, such as feeder pipes 24 and 26, FIGS. 1 and 2. As illustrated in greater detail in FIGS. 9 and 10, a lower feeder pipe segment 102 is connected to an upper feeder pipe segment 104, and the two pipes are clamped together with a split collar 106. Collar flanges 108 provide means for securing the collar flanges together with threaded fasteners 110. Collar rings 112 nest in locking engagement with feeder pipe grooves 114 to form a rigid load-bearing connection between the lower and upper feeder pipe segments 102 and 104. An O-ring 116 is positioned between the slip-fit ends 118 and 120 of feeder pipe segments 102 and 104, respectively, to provide a leakproof seal therebetween. In addition to straight feeder pipe segments, feeder pipe elbows 122, FIG. 2, and other interconnect prior art feeder pipe fittings may also be adapted with the same type of inventive interfitting configurations or with standard interfitting configurations between the inventive pipe segments and the feeder pipe segments. In this manner, the entire washer booth recirculating system can be comprised of quickly fitted polyolefin molded pipe segments suitable for circulating high temperature corrosive bath liquids.

The inventive segmented header pipe can be used, with little or no modification, in related prior art fluid transmission and distribution piping networks, such as are employed in industrial and commercial fire protection systems and agricultural irrigation and sprinkler systems. Thus, as shown in FIGS. 3 through 7, the main distribution will be by means of pipe segments 14A and 14B, whereas subdistribution systems will be through similar inventive pipe segments connected to stub shafts 64. The connecting means may be with the inventive connecting means shown in FIG. 10, by threaded fittings, and/or by quick disconnect fittings, such as shown in FIG. 7.

The foregoing disclosure and discussion relate to preferred exemplary embodiments of the invention. However, it should be understood that other variants and embodiments thereof will become apparent to those skilled in the art upon a reading of the specification taken in conjunction with a study of the attached drawings. Furthermore, it should be understood that such variants and embodiments are possible within the spirit and scope of the invention, as defined by the appended claims.

What is claimed is:

1. Segmented pipe for use in commercial fluid distribution systems, comprising: a plurality of separately molded short polyolefin pipe segments, each having an ingress end and an egress end, the ingress end of a first pipe segment being sized to telescopically slip fit over the egress end of a second pipe segment each of said pipe segments having a peripheral locking groove, a pair of arcuate locking collars spanning adjacent locking grooves of said first and second pipe segments when said first and second pipe segments are interconnected in a slip-fit relationship, and nesting rings extending radially inward from said arcuate locking collars positioned and sized to nest in said locking grooves in longitudinally and axially rigid, bending-resistant, locking engagement between said first and second pipe segments.

2. The segmented pipe of claim 1, wherein each pipe segment is approximately twelve inches in length.

3. The segmented pipe of claim 1, wherein each of said arcuate locking collars spans an arc of substantially 180°, includes means to secure said pair of arcuate locking collars so as to substantially encircle and secure said slip-fit ends of said first and second pipe segments in rigid axial alignment.

4. Segmented pipe for use in commercial fluid distribution systems, comprising: a plurality of separately molded polyolefin pipe segments of substantially equal length and equal inside and outside major diameter walls; means to connect said pipe segments to form a horizontal header in which each said pipe segment is adjustable about its longitudinal axis independent of any other of said interconnected pipe segments; a polyolefin pipe stub integrally molded with and normal to each of said pipe segments, said pipe stub having a smooth cylindrical inner wall; a polyolefin cylindrical sleeve having an upper end, a lower end, an inner wall, and a smooth cylindrical outer wall dimensioned to longitudinally slip fit within said pipe stub inner wall; and quick release means to lock and to unlock said polyolefin cylindrical sleeve therein.

5. The segmented pipe of claim 4, wherein each segment is approximately twelve inches in length and between four and five inches in diameter.

6. The segmented pipe of claim 4, wherein at least one of said pipe segments has two or more of said polyolefin pipe stub segments integrally molded thereto.

7. Segmented pipe for use in commercial fluid distribution systems, comprising: a plurality of separately molded polyolefin pipe segments of substantially equal length and equal inside and outside major diameter walls; means to connect said pipe segments to form a horizontal header in which each said pipe segment is adjustable about its longitudinal axis independent of any other of said interconnected pipe segments; a polyolefin pipe stub integrally molded with and normal to each of said pipe segments, said pipe stub having a smooth cylindrical inner wall; a polyolefin cylindrical sleeve having an upper end, a lower end, an inner wall, and a smooth cylindrical outer wall dimensioned to longitudinally slip fit within said pipe stub inner wall; and quick release means to lock and to unlock said polyolefin cylindrical sleeve therein, wherein said means to connect said pipe segments comprises: providing one end of each pipe segment with a decreased diameter on its outside wall and providing the opposite end of each pipe segment with an inside wall of increased diameter dimensioned to permit a slip fit between the outside wall of decreased diameter of a first pipe segment and the inside wall of increased diameter of a second pipe segment; an O-ring groove in said outside wall of decreased diameter; an O-ring groove in said inside wall of increased diameter axially aligned with said O-ring groove in said outside wall of decreased diameter to enclose an O-ring between said grooves; a first groove in said major outside diameter wall axially offset from said outside wall of decreased diameter to form a first flange therebetween; a second groove in said major outside diameter wall axially offset and adjacent to said opposite end of said pipe segment to form a second flange about the periphery of said opposite end of said pipe segment; a first arcuate collar segment having a major interior wall diameter approximating the major exterior wall diameter of said pipe segment; a pair of parallel flanges projecting radially inwardly from said collar major interior wall sized and spaced to nest in said first groove of said first pipe segment and to nest in said second groove of said second pipe segment when said first and second pipe segments are slip fitted together, both of said first and second arcuate collar segments having an arcuate measure of substantially 180°; and means to secure said first and second arcuate collars together to encircle said first end of said first pipe segment and said second end of said second pipe segment to lock said first and second pipe segments in rigid concentric axial alignment.

8. The segmented pipe of claim 7, wherein said cylindrical sleeve has internal threads to receive in threaded interlocking leakproof engagement therewith an external pipe having matching external threads.

9. The segmented pipe of claim 7, including quick connect-disconnect means to secure said circular sleeve in said pipe stub, including a cam lever having a cam face on its upper end and a lever arm depending from said cam face; an opening in said pipe stub wall; and means to pivotally journal said cam lever whereby said cam face is positioned in said opening in said pipe stub wall to pivot into and out of pressure contact with said outer wall of said sleeve.

10. The segmented pipe of claim 9, including an exterior peripheral groove in said circular sleeve positioned to receive said cam face of said cam lever, whereby a first increment of downward pivotal movement of said cam lever arm pivots said cam face upwardly into said peripheral groove to lock said circular sleeve within said pipe stub.

11. The segmented pipe of claim 10, wherein said sleeve has an upper edge; means to delimit upward movement of said sleeve; and a seal between said sleeve upper edge and said means to delimit upward movement of said sleeve, whereby a second increment of downward pivotal movement of said cam lever arm causes said cam face to urge said sleeve upper end into sealing engagement with said seal.

12. Segmented pipe for use in commercial fluid distribution systems, comprising: a plurality of separately molded short polyolefin pipe segments, each having an ingress end and an egress end, the ingress end of a first pipe segment being sized to telescopically slip fit over the egress end of a second pipe segment, each end of said pipe segments having a peripheral locking groove; a pair of arcuate locking collars spanning adjacent locking grooves of said first and second pipe segments when said first and second pipe segments are interconnected in a slip-fit relationship; nesting rings extending radially inward from said arcuate locking collars positioned and sized to nest in said locking grooves in longitudinally and axially rigid, bending-resistant, locking engagement between said first and second pipe segments, wherein each pipe segment is approximately twelve inches in length, and wherein each of said arcuate locking collars spans an arc of substantially 180°; and means to secure said pair of arcuate locking collars so as to substantially encircle and secure said slip-fit ends of said first and second pipe segments in rigid axial alignment.

* * * * *